Feb. 7, 1961
J. H. ZICH ET AL
2,970,810
JACK STAND
Filed July 7, 1958
2 Sheets-Sheet 1
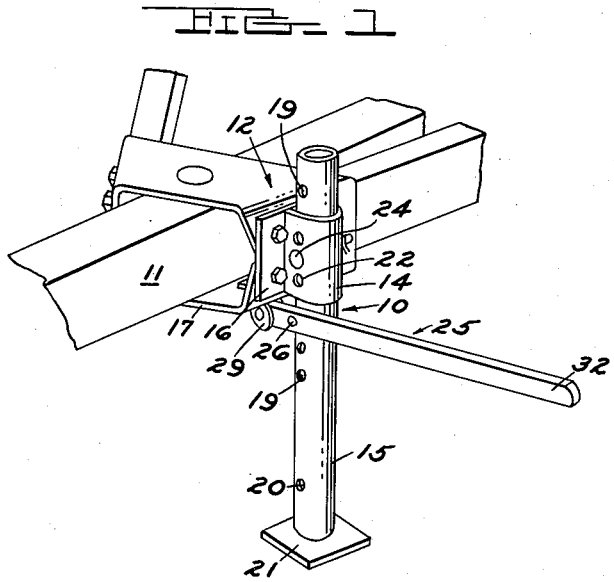
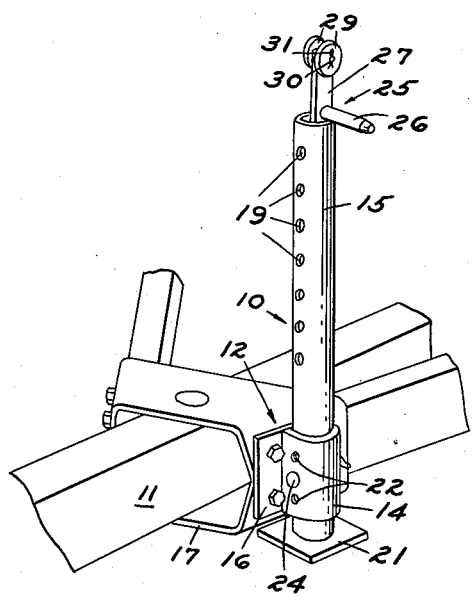
J. H. ZICH
G. A. OLIVER
INVENTORS
BY
E. C. McRAE
J. R. FAULKNER
P. F. HILDER
ATTORNEYS

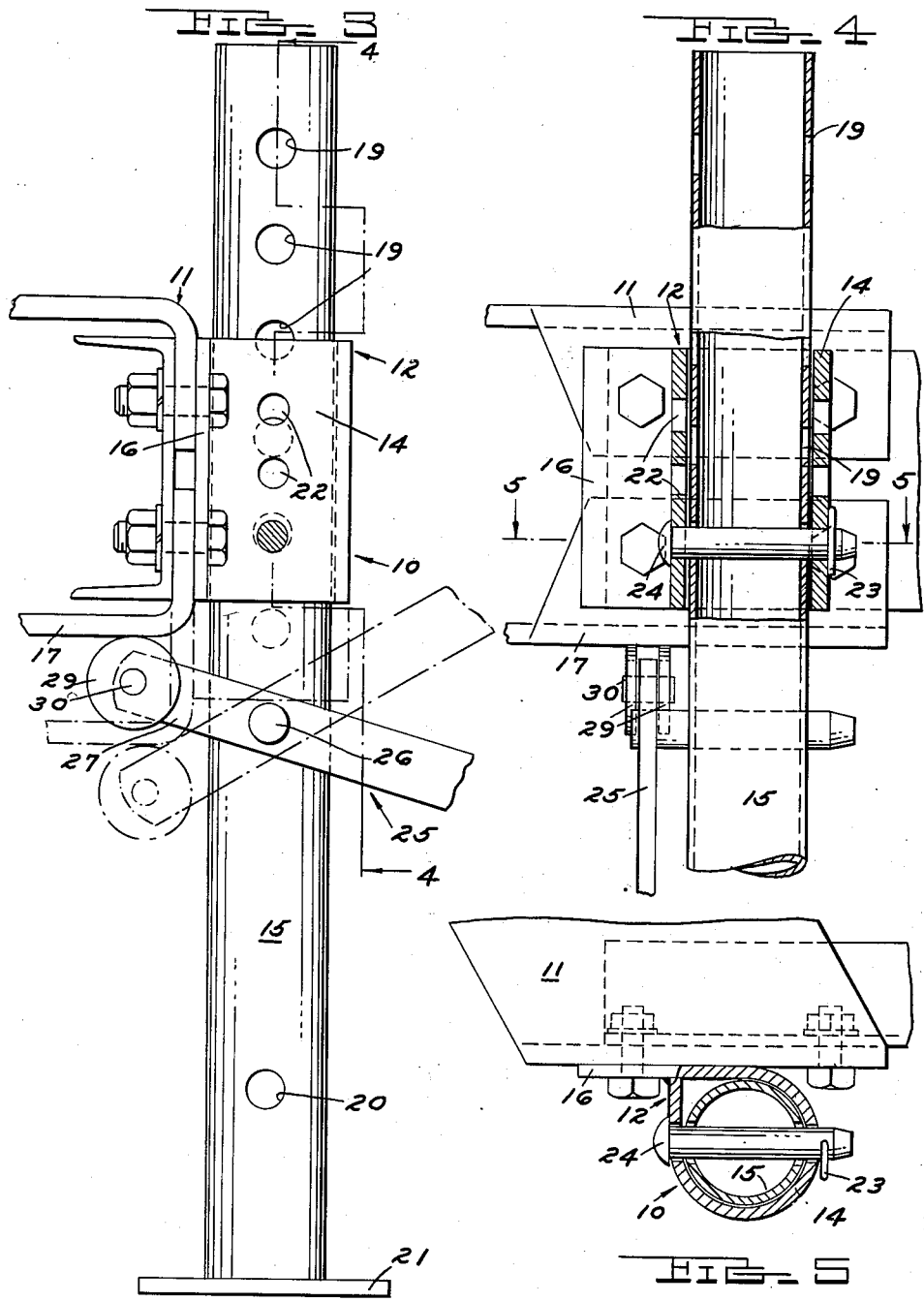

United States Patent Office 2,970,810
Patented Feb. 7, 1961

2,970,810

JACK STAND

John H. Zich and George A. Oliver, Birmingham, Mich., assignors to Ford Motor Company, Dearborn, Mich., a corporation of Delaware Filed July 7, 1958, Ser. No. 746,854

7 Claims. (Cl. 254—86)

This invention relates to jack stands of the type used as a third support for a two wheel vehicle when parked, and for facilitating the coupling and uncoupling of such a vehicle from a towing vehicle.

Two wheel vehicles of the type pulled behind tractors, including pull type combines, hay balers, forage harvesters, and other implements, usually are provided with a forwardly extending tongue for attachment to the tractor. The tongue of such vehicles is locked to the vehicle rather than being free to swing up and down independently of the vehicle, the principal weight of the vehicle being supported by the vehicle wheels and the tractor forming a third point of support of the vehicle during use. It is customary to provide jack stands for such vehicles to supply a third support for the vehicle when parked and disconnected from the tractor, and to raise and support the tongue of the vehicle to facilitate hitching to and unhitching from the tractor. Jack stands of this type may be mounted on the vehicle tongue, or may be mounted at any other convenient point on the vehicle.

Jack stands frequently used are of the automotive type having a stepped post and ratcheting pawl, and of the type having a jack post and a screw threaded crank to raise and lower the post. Such jack stands in agriculture use tend to become rusty, are apt to become bent, and are subject to becoming clogged by dirt so as to make them difficult to operate.

The jack stand of the present invention comprises a vertically extending sleeve member mounted adjacent a horizontal surface of the implement and may be mounted on the side of the implement tongue. A supporting post is vertically slidable within the sleeve member, and is provided with a series of vertically spaced transverse holes, at least one and preferably several of such holes also being provided in the sleeve member. A pin is insertable through aligned holes in the sleeve member and post to lock the parts. A jacking lever is provided with a fulcrum pin adjacent one end of thee lever for engagement in a hole in the post and serves to raise or lower the implement relative to the post after the pin has been removed.

Among the objects of the present invention are to provide a jack stand which is simple, durable, non-clogging and non-rusting, dependable and easily operated, and easily and economically manufacture; and generally to improve jack stands of the type described.

Other objects and objects relating to details and economies of construction and use will be more apparent from the detailed description to follow:

Our invention is clearly defined in the appended claims. In the claims, as well as in the description, parts may at times be identified by specific names for clarity and convenience, but such nomenclature is to be understood as having the broadest meaning consistent with the context and with the concept of our invention as distinguished from the pertinent prior art. The best form in which we have contemplated applying our invention is illustrated in the accompanying drawings forming part of this specification in which:

Figure 1 is a perspective view of a vehicle tongue with a jack stand of the present invention applied thereto.

Figure 2 is a view similar to Figure 1, the jack stand being shown in raised, inoperative position and the jacking lever being shown in carrying position.

Figure 3 is a side elevation of the jack stand.

Figure 4 is a vertical elevation of the jack stand taken at right angles to the elevation of Figure 3, portions of the jack stand being shown in vertical section taken along the line 4—4 of Figure 3.

Figure 5 is a transverse section of the jack stand taken along the line 5—5 of Figure 4.

Referring to the drawings, the jack stand 10 of the present invention may be mounted on the tongue 11 of a two wheeled vehicle or may be counted elsewhere on the vehicle structure. The jack stand comprises a vertically extending sleeve member 12 which may be formed of a strip of steel bent into the shape indicated in Figure 5 to provide a vertically extending sleeve portion 14 for receiving a support post 15 which preferably is formed of a section of pipe. A flange portion 16 of the sleeve member 12 serves as an attaching flange for securing the sleeve member to the side of the tongue 11 or to any other portion of the vehicle where there is a generally horizontal jacking surface 17 adjacent the lower end of the sleeve member.

The support post 15 is vertically slidable within the sleeve member 12 and is provided with a series of transversely extending, equally vertically spaced holes 19 formed in the portion extending downwardly from the upper end of the post, and a single hole 20 adjacent the lower end of the post. An enlarged ground engaging plate or foot 21 may be provided at the lower end of the post 15 to increase the area of ground contact.

At least one, and preferably a series of transverse holes 22 are provided in the sleeve portion 14 of the sleeve member, these holes being alignable with the holes 19 and hole 20 of the post upon sliding the post vertically within the sleeve member. The holes 22 preferably are equally spaced and spaced slightly greater than the spacing between the holes 19 in the post for a reason to be explained later. Also, the holes 22 in the sleeve member 12 may be slightly smaller in diameter than the holes 19 in the post to permit inserting a pin 24 through the sleeve member and post to lock these parts in adjusted position without the necessity of a hole 19 and a hole 22 being perfectly aligned. A spring type cotter pin 23 may be inserted through a transverse hole in the end of pin 24 to retain the pin against displacement.

A jacking lever 25 is provided having fulcrum pin 26 extending laterally from adjacent one end of the lever, the fulcrum pin 26 being adapted to be received within any of the holes 19 in the post 15. The end 27 of the lever 25 adjacent the fulcrum pin 26 may be provided with a pair of rollers 29, 29 formed of a pair of washers rotatably secured to the end of the lever by a transverse pin 30 and cotter pin 31. The jacking lever 25 is preferably straight and of such dimensions as to be insertable within the top of the support post 15 when the lever is not in use, fitting between the pin 24 and the inside surface of the post, as indicated in Figure 2.

Referring to Figures 1 and 3, the vehicle is stored with the support post 15 extending downwardly and supporting the tongue 11 from the ground. When it is desired to couple the vehicle to a tractor or other towing vehicle, the lever 25 is withdrawn from the upper end of the post and the fulcrum pin 26 of the lever inserted within the first hole 19 below the lower end of the sleeve member 12. With the lever 25 extending generally horizontally and the rollers 29, 29 of the lever bearing against the horizontal jacking surface 17, depression of the outer end 32 of the lever will serve to raise the tongue 11 slightly, taking the weight off of the pin 24 so that the pin may be freely withdrawn after the cotter 23 is removed. Then by depressing the end 32 of the lever further or by permitting the end of the lever to rise, the tongue 11 may be raised or lowered a distance corresponding generally to the space between adjacent holes 19 of the post 15. If further raising or lowering of the tongue 11 is desired, the pin 24 is reinserted and the fulcrum pin 26 of the lever moved to the next adjacent higher or lower hole and the jacking operation repeated.

The different vertical spacing of the holes 22 in the sleeve member 12 than the holes 19 in the post 15 permits a much more precise adjustment of the tongue to facilitate coupling to the towing vehicle, and, in addition, facilitates insertion of the pin 24 inasmuch as it will usually be found that some one of the several holes in the sleeve member 12 is aligned with one of the holes in the post 15.

After coupling the tongue 11 to the towing vehicle, the tongue 11 is jacked slightly as above described to permit withdrawal of the pin 24, after which the post 15 may be slid upwardly as indicated in Figure 2, and the pin 24 reinserted through the sleeve 12 and through the lower hole 20 of the post to hold the post in raised position, and the cotter 23 replaced. The lever 25 then may be inserted within the upper end of the post 15 to hold the lever when not being used.

We claim:

1. A jack stand for attachment to a two wheeled vehicle, said jack stand comprising: a vertically extending sleeve member secured to the vehicle, a supporting post vertically slidable within the sleeve member and having an extended, ground-contacting lower end, said sleeve member and said post being provided with a plurality of vertically spaced transverse holes, a jacking lever having a fulcrum pin adjacent one end thereof and insertable in any one of the series of holes in the post, a generally horizontal jacking surface adjacent the lower end of the sleeve member and engaged by the fulcrum pin end of the lever, and a pin insertable through the holes in the sleeve member and post to lock the post and sleeve.

2. A jack stand for attachment to a two wheeled vehicle, said jack stand comprising: a vertically extending sleeve member secured to the vehicle, a supporting post vertically slidable within the sleeve member and having an extended, ground-contacting lower end, said sleeve member and said post each being provided with a plurality of uniformly vertically spaced transverse holes, and the hole spacing in one of said parts being slightly greater than the hole spacing in the other, a jacking lever having a fulcrum pin adjacent one end thereof and insertable in any one of the series of holes in the post, a generally horizontal jacking surface adjacent the lower end of the sleeve member and engaged by the fulcrum pin end of the lever, and a pin insertable through the holes in the sleeve member and post to lock the post and sleeve.

3. A jack stand for attachment to a two-wheeled vehicle, said jack stand comprising: a vertically extending sleeve member secured to the vehicle, a supporting post vertically slidable within the sleeve member and having an extended, ground-contacting lower end, said sleeve member and said post each being provided with a plurality of uniformly vertically spaced transverse holes and the hole spacing in the post being slightly greater than the hole spacing in the sleeve member, a jacking lever having a fulcrum pin adjacent one end thereof and insertable in the series of holes in the post, a generally horizontal jacking surface adjacent the lower end of the sleeve member and engaged by the end of the lever, and a pin insertable through the holes in the sleeve member and post to lock the post and sleeve.

4. A two-wheel vehicle having a jack stand attached thereto, said jack stand comprising a generally cylindrical, vertically extending sleeve member secured to the vehicle, a tubular supporting post vertically slidable within the sleeve and having an extended, ground-contacting lower end, said sleeve member and said post each being provided with a plurality of diametrically extending, uniformly vertically spaced holes and the hole spacing in one of said parts being slightly greater than the hole spacing in the other, a jacking lever having a fulcrum pin adjacent one end thereof and insertable in any one of the series of holes in the post, a generally horizontal jacking surface adjacent the lower end of the sleeve member and engaged by the fulcrum pin end of the lever, and a pin insertable through the holes in the sleeve member and post to lock the post and sleeve.

5. A two-wheel vehicle having a jack stand attached thereto, said jack stand comprising a generally cylindrical, vertically extending sleeve member secured to the vehicle, a tubular supporting post vertically slidable within the sleeve and having an extended, ground-contacting lower end, said sleeve member and said post each being provided with a plurality of diametrically extending, uniformly vertically spaced holes and the hole spacing in one of said parts being slightly greater than the hole spacing in the other, a jacking lever having a fulcrum pin adjacent one end thereof and insertable in any one of the series of holes in the post, a generally horizontal jacking surface adjacent the lower end of the sleeve member and engaged by the fulcrum pin end of the lever, and a pin insertable through the holes in the sleeve member and post to lock the post and sleeve, the jacking lever being insertable in the top of the post and extending between the inner surface of the post and the pin.

6. A two-wheel vehicle having a jack stand attached thereto, said jack stand comprising a generally cylindrical, vertically extending sleeve member secured to the vehicle, a tubular supporting post vertically slidable within the sleeve and having an extended, ground-contacting lower end, said sleeve member and said post each being provided with a plurality of diametrically extending, uniformly vertically spaced holes and the hole spacing in the post being slightly greater than the hole spacing in the sleeve member, a jacking lever having a fulcrum pin adjacent one end thereof and insertable in any one of the series of holes in the post, a generally horizontal jacking surface adjacent the lower end of the sleeve member and engaged by the fulcrum pin end of the lever, and a pin insertable through the holes in the sleeve member and post to lock the post and sleeve, the jacking lever being insertable in the top of the post and extending between the inner surface of the post and the pin.

7. A jack stand for attachment to a two-wheel vehicle, said jack stand comprising: a vertically extending sleeve member secured to the vehicle, a supporting post vertically slidable within the sleeve member and having an extended, ground-contacting lower end, said sleeve member having at least one transverse hole and said post being provided with a plurality of vertically spaced transverse holes, a jacking lever having a fulcrum pin adjacent one end thereof and insertable in any one of the series of holes in the post, a generally horizontal jacking surface adjacent the lower end of the sleeve member and engaged by the fulcrum pin end of the lever, and a pin insertable through the holes in the sleeve member and post to lock the post and sleeve.

References Cited in the file of this patent

UNITED STATES PATENTS

| 1,048,841 | Locke | Dec. 31, 1912 |
| 2,580,640 | Bartch et al. | Jan. 1, 1952 |

FOREIGN PATENTS

| 1,012,804 | France | Apr. 23, 1952 |
| 754,509 | Great Britain | Aug. 8, 1956 |